March 31, 1925.

R. JOHNSON

TWO-CYCLE ENGINE

Filed Oct. 6, 1922

Inventor
Robert Johnson

By William C. Sinton

Attorney

March 31, 1925. 1,531,748
R. JOHNSON
TWO-CYCLE ENGINE
Filed Oct. 6, 1922 4 Sheets-Sheet 3

Inventor
Robert Johnson
By William C Linton
Attorney

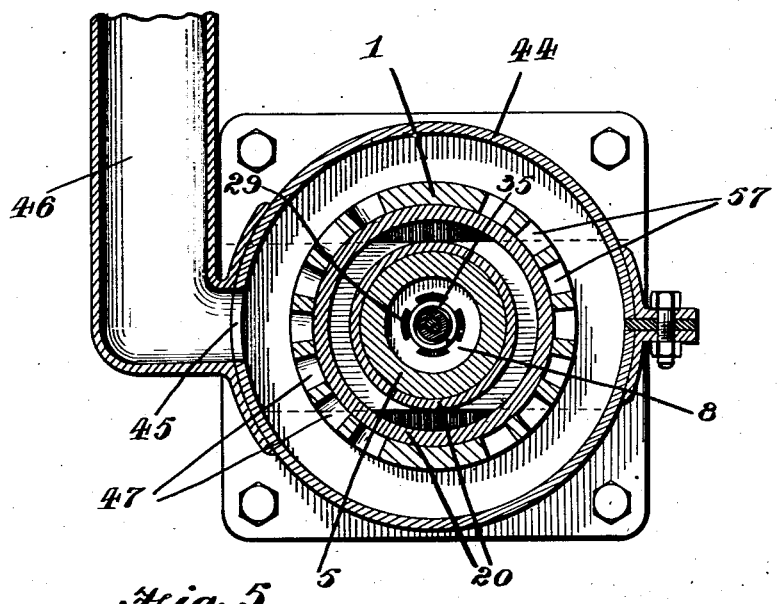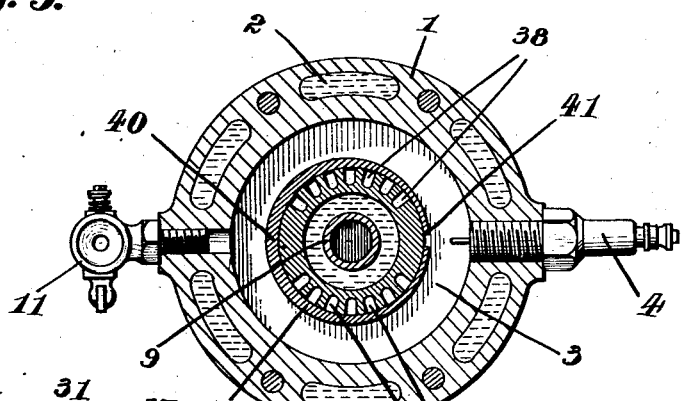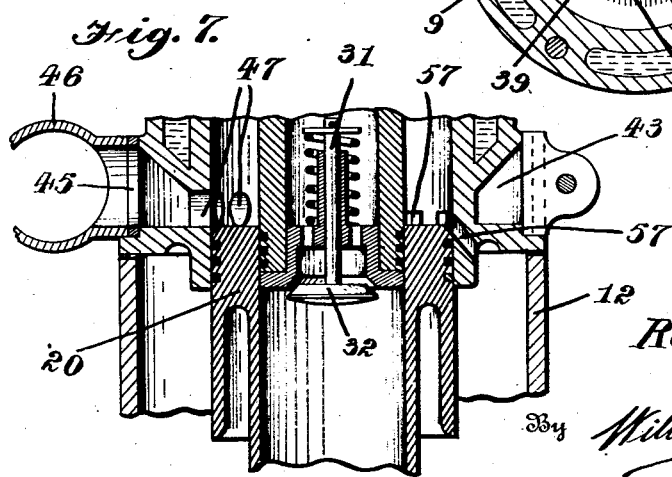

Patented Mar. 31, 1925.

1,531,748

UNITED STATES PATENT OFFICE.

ROBERT JOHNSON, OF SAULT STE. MARIE, ONTARIO, CANADA.

TWO-CYCLE ENGINE.

Application filed October 6, 1922. Serial No. 592,816.

*To all whom it may concern:*

Be it known that I, ROBERT JOHNSON, a British subject, residing at Sault Ste. Marie, in the Province of Ontario, Canada, have invented certain new and useful Improvements in Two-Cycle Engines; and I do hereby declare that the following is a full, clear, and exact description of the invention, such as will enable others skilled in the art to which it appertains to make and use the same.

The present invention relates to new and useful improvements in internal combustion engines, and the principal object thereof resides in the provision of a two cycle engine having the efficiency of a four cycle engine without the necessity of the complications associated with such an engine.

A further object of the invention resides in a novel connection between the piston and the crank shaft, and guide means therefor.

An additional object of the invention consists of a construction whereby there are no gases in the crank case at any time, whereby there is a more perfect mixture in increase in efficiency.

Still a further object of the invention is the provision of a novel valve arrangement for controlling the influx of gas from the carburetor. Further advantages of the invention will appear as the description continues, while others will be definitely pointed out.

The invention is fully disclosed in the following description, and in the accompanying drawings, in which:

Fig. 5 is a section on the line 5—5 of Fig. 2;

Fig. 6 is a section on the line 6—6 of Fig. 2; and,

Fig. 7 is a detail view showing the piston in the same position as in Fig. 1, and the main cylinder in communication with the exhaust pipe.

Figure 1:
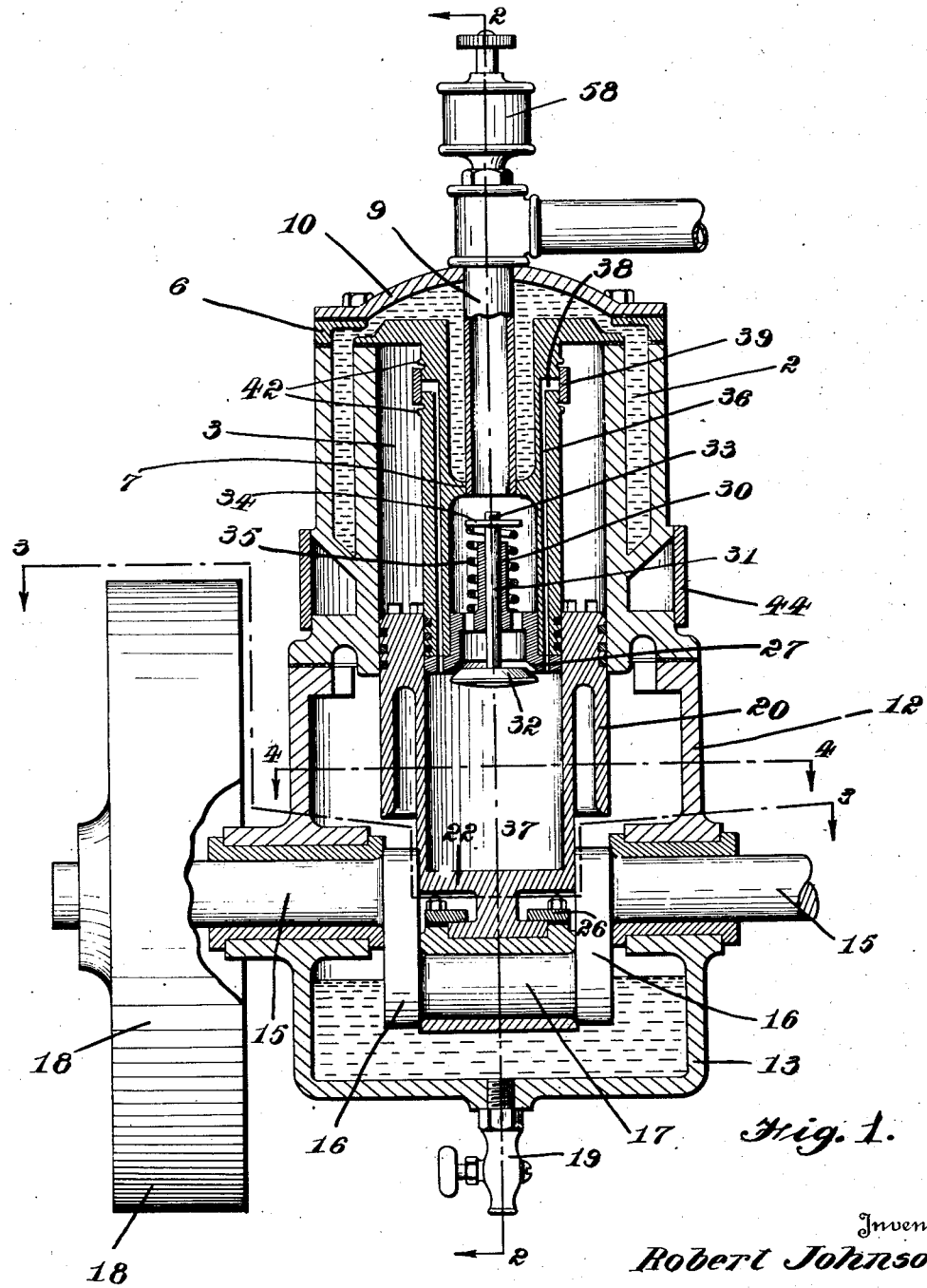
Fig. 1 is a vertical section through the engine at the beginning of the first or compression stroke.

Referring to the various views by corresponding reference characters throughout, the numeral 1 designates the cylinder which is surrounded by a water jacket 2 in any usual manner.

The upper portion 3 of the cylinder is adapted for use as an explosion chamber, and has spark plugs 4 extending therein. At the upper edge of the cylinder lies the peripheral flange 6 of a piston guide member 5. This member is hollow, having a partition 7 at the intermediate portion thereof forming a valve chamber 8, the function and operation of which will be subsequently pointed out. The gas inlet pipe 9 from the carburetor passes through the partition and communicates with the valve chamber. This pipe is surrounded and the guide member covered by a plate 10 which forms the cover of a water chamber, within the combustion chamber. A relief valve 11 is provided at the upper part of the cylinder for co-operation with the explosion chamber. The crank case, consisting of upper and lower portions 12 and 13 respectively, is secured to the lower end of the cylinder, and the parts are bolted together as at 14. The crank shaft 15 (Figure 1) is journalled in the walls of the case as is customary, this shaft being provided with crank arms 16 joined by means of a crank pin 17. One end of the crank shaft carries a fly wheel 18 while the base of the crank case is fitted with a drain valve 19 communicating with the oil in the case.

The guide 5 is surrounded by hollow piston 20 which reciprocates relatively thereto. This piston has a peripheral groove 21 for decreasing its weight. At the lower end of the piston is formed a cross head 22, the ends of which are curved as at 23 (Fig. 3) for engagement in the guide grooves 24 in the interior crank case walls. The sides of the cross head are grooved as at 25, for accommodation of the sliding bearings 26 which receive the crank pin 17. Accordingly, the circular motion of the crank pin is the result of the vertical movement of the piston and the horizontal movement of the bearings.

Within the chamber 8 is fitted a valve seat 27, which is formed with a back 28 lying within the chamber and provided with a plurality of ports 29. A bushing 30 extends upwardly from back and receives the slidable stem 31 on the lower end of which is formed a valve 32, which is bevelled for cooperation with the seat. At the opposite end of the stem is inserted a pin 33 which acts as a stop for the disk 34. An expansion spring 35 which surrounds the bushing 30 bears against the back and disk, and maintains the valve normally in closed position. A series of conduits 36 is formed through the wall of the guide and through the valve seat 27, thus communicating with the auxiliary cylinder 37 formed in the hollow piston. The upper ends of these conduits communicate with the explosion chamber through the ports 38 also formed through the guide wall.

The novel valve structure associated with these ports consists of an elastic ring 39 surrounding them. This ring is thicker at the intermediate portion 40 (Fig. 6) than at the ends 41. This structure of the ring prevents breaking at the intermediate portion, where the greatest strain occurs during the spreading. Longitudinal movement of the ring along the guide is effectively avoided by the spaced ribs 42 at opposite sides of the ports 38.

The water jacket 2 terminates short of the cylinder 1, and the space 43 thus formed is closed by an annular plate 44, whereby an exhaust conduit is formed. At one or more points this plate is apertured as at 45 for communcation with the exhaust pipe 46. The cylinder wall is perforated at its lower end as at 47 to provide communication between the cylinder and the exhaust conduit.

Figure 3:
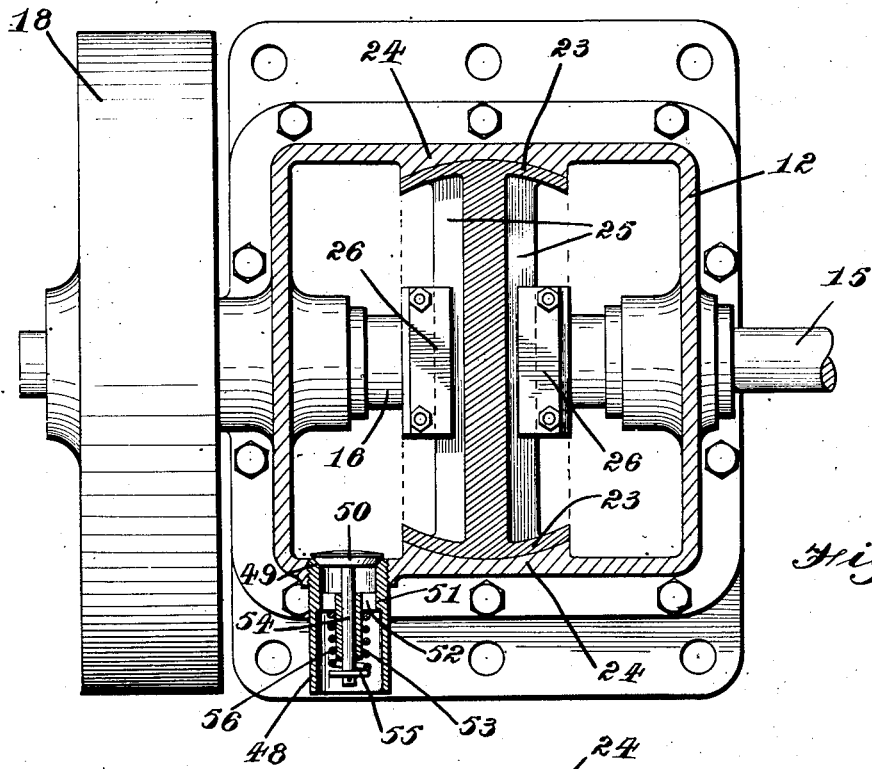
Fig. 3 is a section on the line 3—3 of Fig. 1.
Figure 4:
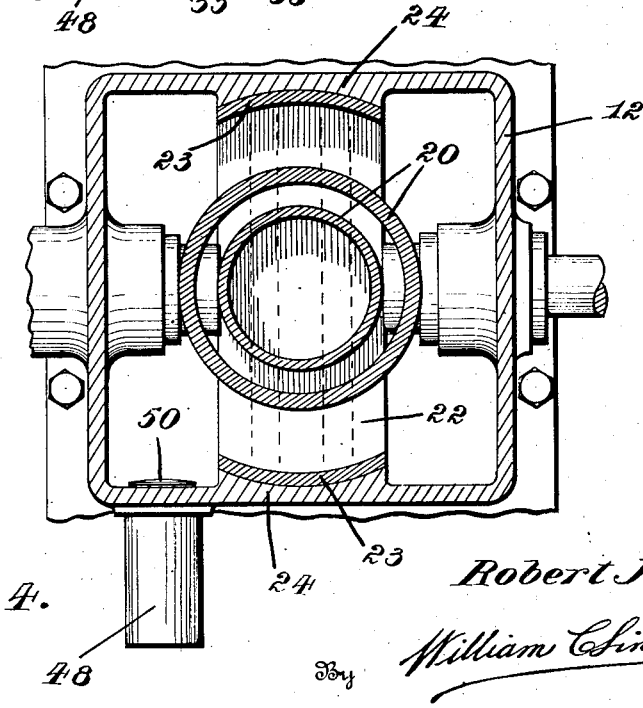
Fig. 4 is a section on the line 4—4 of Fig. 1.

As shown in Fig. 3, a nipple 48 is threaded into the crank case and is bevelled at its inner end 49 to provide a seat for the valve head 50. This nipple is formed with an interior wall 51 provided with ports 52 and an outwardly extending bushing 53. The head 50 carries a stem 54 which passes through the bushing and is provided at its outer end with a cap 55. An expansion spring 56 surrounding the bushing bears against the partition and seat, thus normally holding the valve in closed position. The crank case is in communication with the cylinder through a duct 57 formed through the lower end of the cylinder wall.

An oil cup 58 is mounted on the intake pipe 9 for providing a flow of oil to the contacting surfaces of the piston and piston guide.

Figure 2:
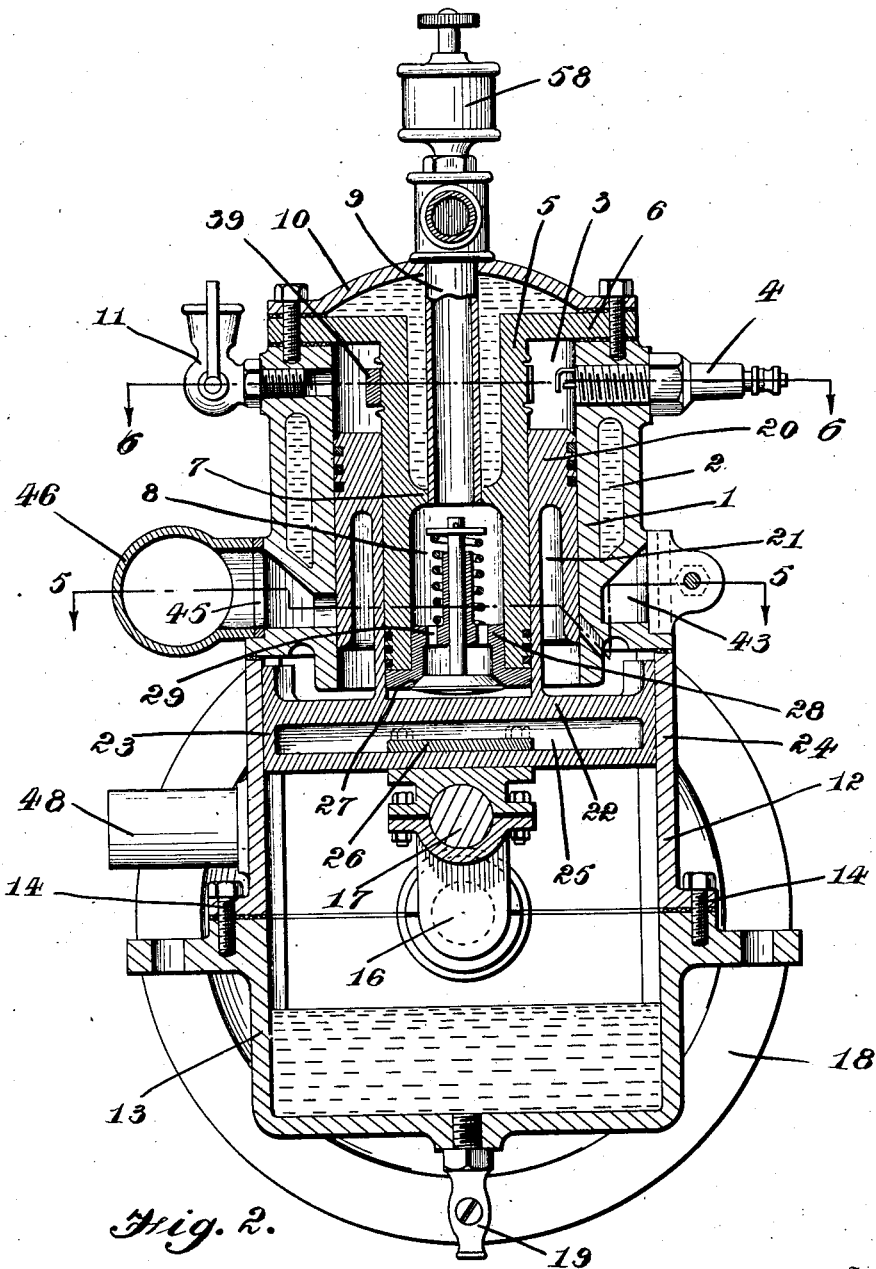
Fig. 2 is a section on the line 2—2 of Fig. 1 but showing the piston at the end of the first or compression stroke.

The operation of the engine is as follows: When the parts are in the position shown in Fig. 2, the gas is under compression and ready for ignition in the space 3. After the explosion occurs, the piston 20 moves downwardly so that the exhaust ports 47 are uncovered as shown in Fig. 7. The same movement causes an influx of air from the crank case through the duct 57 into the cylinder, this air having beeen drawn into the crank case through the valve 49 during the previous upward movement of the piston. Obviously, this valve is free to close during the downward movement of the piston during which there is no suction within the case and the expansion of the spring 56 is unopposed. Simultaneously, the downward movement causes a suction in the auxiliary cylinder 37, as a result of which the valve head 32 is pulled downwardly allowing a charge of gas to enter this cylinder from the intake pipe 9. It should also be noted that at this instant, the suction in the auxiliary cylinder operates through the conduits 36 to bring the ring 39 into close engagement with the ports 38. On the second upward stroke the air inlet 57 is closed, and the air within the cylinder becomes compressed. The partial vacuum in the auxiliary cylinder 37, having been satisfied with the influx of gas, the spring 35 is now free to close the valve, and again a pressure is accumulated in the auxiliary cylinder as the piston rises. This pressure acting through the conduits 36 and ports 38, spreads the ring 39 and allows the entrance of the gas into the cylinder where it mixes with the air already introduced. When the parts have returned to the position shown in Fig. 2, the combustion chamber 3 is ready for another explosion, and the cycle is repeated in the manner already set forth.

Although a specific embodiment of the invention has been illustrated and described, it is to be understood that various alterations in the details of construction may be resorted to without departing from the spirit of the invention, as indicated by scope of the appended claims.

Having thus fully described my invention what I claim as new and desire to secure by Letters Patent is:

1. An internal combustion engine comprising a main cylinder and a crank case at the lower end thereof, means of fluid communication between the crank case and cylinder, a hollow piston operable in said cylinder, a guide member supported in said cylinder and receivable within said piston, a valve chamber formed in said guide member, a downwardly opening check valve in said chamber, a fuel supply pipe communicating with said chamber, conduits formed through the wall of said guide member and leading into the cylinder establishing communication between said cylinder and the interior of the hollow piston, a pressure actuated device for controlling the flow through said conduits, and exhaust means from said cylinder.

2. An internal combustion engine comprising a main cylinder and a crank case at the lower end thereof, means of fluid communication between the crank case and cylinder, a hollow piston operable in said cylinder, a guide member supported in said cylinder and receivable within said piston, a valve chamber formed in said guide member, a downwardly opening check valve in said chamber, a fuel supply pipe communicating with said chamber, conduits formed through the wall of said guide member and leading into the cylinder establishing communication between said cylinder and the interior of the hollow piston, a pressure actuated device for controlling the flow through said conduits, and exhaust means from said cylinder.

3. An internal combustion engine comprising a cylinder a crank case formed at the lower portion thereof, a hollow piston operable in said cylinder, a guide member supported in the cylinder and adapted for reception within the hollow piston, a cross head formed at the lower end of said piston, a crank shaft passing through the walls of the crank case, a slidable bearing supported by said cross head and operatively connected with the crank shaft, a fuel conduit through said guide member and communicating with the interior of the hollow piston, a downwardly opening check valve arranged in said conduit, means of communication between the interior of the hollow piston and the cylinder, and pressure actuated means for controlling said means of communication.

4. An internal combustion engine comprising a cylinder, a hollow piston operable within said cylinder, a guide member adapted for reception within said hollow piston, a fuel conduit through the guide member and communicating with the interior of the hollow piston, a check valve arranged in said conduit, means of communication between the interior of the piston and the cylinder, a pressure actuated valve for controlling said means, and inwardly opening check valve formed in the wall of the crank case, means of communication between said case and the cylinder, and an exhaust pipe in communication with the cylinder.

In witness whereof I have hereunto set my hand.

ROBERT JOHNSON.